United States Patent
Wang et al.

(10) Patent No.: US 10,833,597 B2
(45) Date of Patent: Nov. 10, 2020

(54) HUB DEVICE AND POWER SUPPLY METHOD THEREOF

(71) Applicant: Wistron Corporation, New Taipei (TW)

(72) Inventors: Sheng-Hung Wang, New Taipei (TW); Wei-Chiao Huang, New Taipei (TW); Pei-Kai Hsu, New Taipei (TW); Yung-Yu Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 203 days.

(21) Appl. No.: 16/018,071

(22) Filed: Jun. 26, 2018

(65) Prior Publication Data

US 2019/0319545 A1 Oct. 17, 2019

(30) Foreign Application Priority Data

Apr. 13, 2018 (TW) .............................. 107112772 A

(51) Int. Cl.
*H02M 7/06* (2006.01)
*H01R 13/66* (2006.01)
(Continued)

(52) U.S. Cl.
CPC .............. *H02M 7/064* (2013.01); *G06F 1/26* (2013.01); *H01R 13/6675* (2013.01); *H01R 13/70* (2013.01); *H02M 5/2573* (2013.01)

(58) Field of Classification Search
CPC ....... H02M 7/064; H02M 5/2573; G06F 1/26; H01R 13/6675; H01R 13/70
See application file for complete search history.

(56) References Cited

U.S. PATENT DOCUMENTS 6,541,879 B1 * 4/2003 Wright .................... H02J 1/102
                                                                 307/31
8,370,650 B2 * 2/2013 Paniagua, Jr. .......... G06F 1/263
                                                                 320/114
(Continued)

FOREIGN PATENT DOCUMENTS

CN        101777786         7/2010
CN        204391770         6/2015
(Continued)

OTHER PUBLICATIONS

Office Action of Taiwan Counterpart Application, dated Sep. 18, 2018, pp. 1-6.
(Continued)

*Primary Examiner* — Carlos Amaya
(74) *Attorney, Agent, or Firm* — JCIPRNET

(57) ABSTRACT

A hub device and a power supply method thereof are provided. The hub device includes a power input port, first and second power output ports, a power management circuit and a controller. When first and second electronic devices are respectively connected to the first and second power output ports, the controller determines an input electric power from at least one default supply power of the power adapter based on first operating power information of the first electronic device and second operating power information of the second electronic device, so as to control the power adapter to provide the input electric power to the power input port. The power management circuit receives the input electric power to generate first and second operating power, so as to output the first operating power to the first power output port and output the second operating power to the second power output port.

15 Claims, 8 Drawing Sheets

(51) Int. Cl.
    *G06F 1/26*     (2006.01)
    *H02M 5/257*     (2006.01)
    *H01R 13/70*     (2006.01)

(56) References Cited

U.S. PATENT DOCUMENTS

| | | |
|---|---|---|
| 9,395,799 B2 | 7/2016 | Masson et al. |
| 9,535,435 B2 | 1/2017 | Lalitnuntikul et al. |
| 9,584,041 B2 | 2/2017 | Rokusek et al. |
| 2011/0285344 A1 | 11/2011 | Lin et al. |
| 2014/0125131 A1 | 5/2014 | Lalitnuntikul et al. |
| 2015/0054451 A1 | 2/2015 | Rokusek et al. |
| 2015/0121095 A1* | 4/2015 | Tsai .................. G06F 1/266 |
| | | 713/310 |

FOREIGN PATENT DOCUMENTS

| | | |
|---|---|---|
| TW | 1413338 | 10/2013 |
| TW | 1498704 | 9/2015 |

OTHER PUBLICATIONS

"Office Action of China Counterpart Application", dated Jul. 23, 2020, p.1-p.13.

\* cited by examiner

HUB DEVICE AND POWER SUPPLY METHOD THEREOF

CROSS-REFERENCE TO RELATED APPLICATION

This application claims the priority benefit of Taiwan application serial no. 107112772, filed on Apr. 13, 2018. The entirety of the above-mentioned patent application is hereby incorporated by reference herein and made a part of this specification.

BACKGROUND

1. Technical Field

The disclosure relates to an electronic device, and particularly relates to a hub device and a power supply method of the hub device.

2. Description of Related Art

Through the development of technology, electronic products, such as computer, communication, and consumers' electronic products, have been widely adopted. In view of the trend, it can be anticipated that sufficient power supply may play an important role in the electronic products. Based on the power consumption of the electronic products, suitable power adapters are generally required by the electronic products to supply power to or charge the electronic products. Specifically, one of the purposes of the power adapter is to covert an alternating current (AC) power into a direct current (DC) power as required by the electronic product. Hence, when a user owns multiple electronic products, the user needs to prepare a variety of power adapters for these electronic products. As a consequence, there may be a great number of power adapters, which is inconvenient for the users.

Currently, one-to-multiple port USB hubs are already available on the market. Such USB hub is configured to supply power to multiple electronic devices, and to transmit the data to each of the multiple electronic devices. However, the output voltage available in such USB hubs is usually fixed and cannot be adaptively adjusted based on the needs of different electronic devices. Hence, issues such as power overload or inefficient conversion may arise when using the conventional one-to-multiple USB hubs.

SUMMARY

Exemplary embodiments of the disclosure provide a hub device and a power supply method of the hub device capable of providing multiple sets of suitable operating powers at a higher conversion efficiency based on the needs of electronic devices actually connected to the hub device.

An embodiment of the disclosure provides a hub device. The hub device includes a power input port, a first power output port, a second power output port, a power management circuit, and a controller. The power input port is connected to a power adapter. The power management circuit is coupled to the power input port, the first power output port, and the second power output port. The controller is coupled to the power input port, the first power output port, the second power output port, and the power management circuit. When a first electronic device and a second electronic device are respectively connected to the first power output port and the second power output port, the controller determines an input electric power from at least one default supply power of the power adapter based on first operating power information of the first electronic device and second operating power information of the second electronic device, so as to control the power adapter to provide the input electric power to the power input port. The power management circuit receives the input electric power to generate a first operating power and a second operating power, so as to output the first operating power to the first power output port and output the second operating power to the second power output port.

From another perspective, an embodiment of the disclosure provides a power supply method for a hub device. The hub device includes a power input port, a first power output port, and a second power output port. The power supply method includes steps as follows. At least one default supply power of a power adapter is obtained. The power adapter is connected to the power input port. An input electric power is determined from the at least one default supply power of the power adapter based on first operating power information of a first electronic device and second operating power information of a second electronic device when the first electronic device and the second electronic device are respectively connected to the first power output port and the second power output port. The power adapter is controlled to provide the input electric power to the power input port. A first operating power and a second operating power are generated based on the input electric power, so as to output the first operating power to the first power output port and output the second operating power to the second power output port.

Based on the above, in the embodiments of the disclosure, the hub device may have multiple power output ports respectively connected to multiple electronic devices. The hub device may control the power adapter to provide the corresponding input electric power based on the electronic device actually connected to the hub device. The hub device may generate multiple sets of operating powers based on the input electric power. Accordingly, operating powers required for normal operations may be supplied to multiple electronic devices. As such, the number of power adapters may be significantly reduced, so as to simplify the configuration of the hubs.

In order to make the aforementioned and other features and advantages of the disclosure comprehensible, several exemplary embodiments accompanied with figures are described in detail below.

DESCRIPTION OF THE EMBODIMENTS

Figure 1:
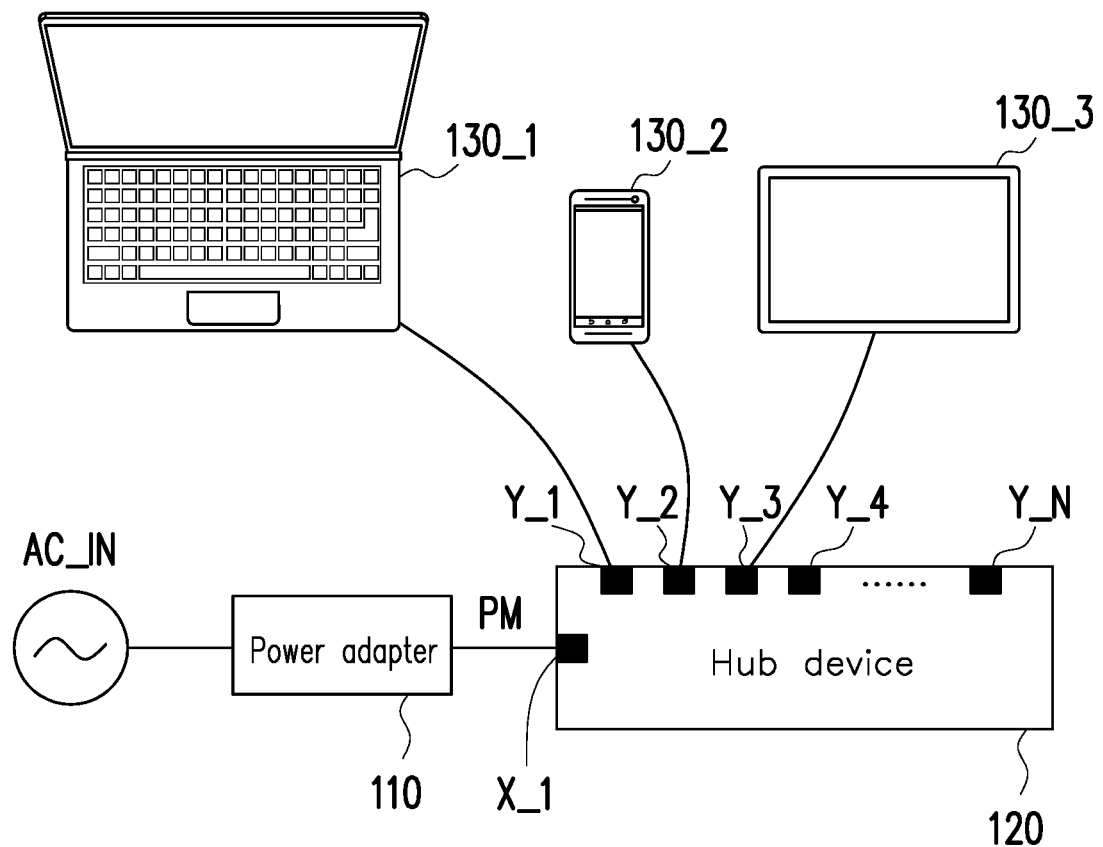
FIG. 1 is a schematic view illustrating that a hub device provides operating powers to a plurality of electronic device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Some embodiments of the disclosure are described in the following with the accompanying drawings, and reference symbols are used for the following descriptions. Where the same reference symbols are found in different drawings, these reference symbols should be deemed as referring to like or similar components. These embodiments only form part of the disclosure and do not thoroughly disclose all the possible embodiments of the disclosure. More specifically, these embodiments only serve as examples of the electronic device and the power supply method as claimed in the disclosure.

FIG. 1 is a schematic view illustrating that a hub device provides operating powers to a plurality of electronic devices according to an embodiment of the disclosure. Referring to FIG. 1, a power adapter 110 may be connected between the hub device and an alternating current (AC) power AC_IN (e.g., mains electricity) to convert the AC power AC_IN into a direct current (DC) power at a specific voltage. In the embodiment, as shown in FIG. 1, the hub device 120 may include a power input port X_1 and "N" number of power output ports Y_1 to Y_N, wherein "N" is an integer greater than 2. At least one electronic device may be connected to the power output ports Y_1 to Y_N of the hub device 120. For example, as shown in FIG. 1, three electronic devices 130_1 to 130_3 are respectively connected to the power output ports Y_1 to Y_3. The power devices 130_1 to 130_3 may be electronic devices, such as power bank(s), notebook computer(s), tablet computer(s), smart phone(s), personal digital assistant(s), digital camera(s), or game console(s), etc. However, the disclosure is not limited thereto.

It should be noted that, in an embodiment, operating powers required for the three electronic devices 130_1 to 130_3 may be different, the hub device 120 is configured to receive an input electric power PM from the power adapter 110, and the hub device 120 is further configured to convert the input electric power PM into the operating powers applicable to the respective electronic devices 130_1 to 130_3. More specifically, the hub device 120 may covert a set of input electric powers PM into a plurality of sets of operating powers having different voltage values and current values, and may output the operating powers via the suitable power output ports Y_1 to Y_3. Accordingly, the electronic devices 130_1 to 130_3 connected to the hub device 120 are supplied with the applicable operating powers. As such, even under the condition that one power adapter is occupied, the applicable operating powers may still be supplied to the multiple electronic devices.

In one embodiment, the power adapter 110 is capable of providing different default supply powers. The hub device 120 may choose one of the default supply powers as the input electric power PM based on power requirements of the electronic devices 130_1 to 130_3, and the hub device 120 may control the power adapter 110 to provide the chosen input electric power PM. Therefore, the hub device 120 is configured to generate the plurality of sets of the operating powers at desirable conversion efficiency, and the electric power may be supplied to the electronic devices 130_1 to 130_3 by the same power adapter 110.

Figure 2:
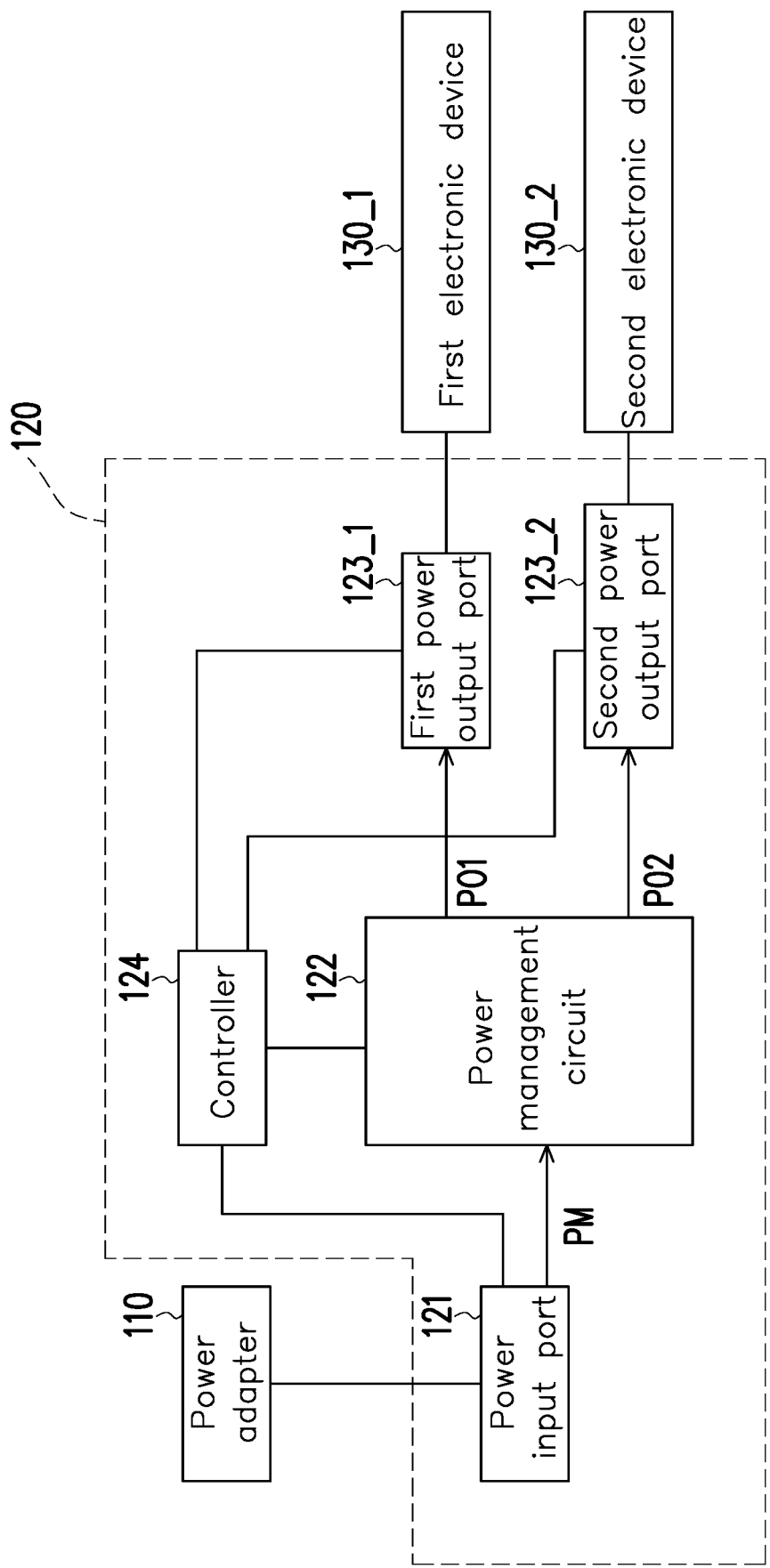
FIG. 2 is a block diagram illustrating a hub device according to an embodiment of the disclosure.

In the following, details of the operation of the hub device 120 are described with reference to some embodiments. FIG. 2 is a block diagram illustrating a hub device according to an embodiment of the disclosure. Referring to FIG. 2, the hub device 120 may include a power input port 121, a first power output port 123_1, a second power output port 123_2, a power management circuit 122, and a controller 124. In one example, the hub device 120 may include two power output ports (i.e., the first power output port 123_1 and the second power output port 123_2), however, the disclosure is not limited thereto.

The power input port 121 is connected to the power adapter 110. The power input port 121 may include a connector, a transmission interface circuit, and/or the like. The first power output port 123_1 and the second power output port 123_2 are respectively connected to the first electronic device 130_1 and the second electronic device 130_2, and may respectively include the connector, the transmission interface circuit, and/or the like. The power management circuit 122 is coupled to the power input port 121, the first power output port 123_1, and the second power output port 123_2. In addition, the power management circuit 122 is configured to receive the input electric power PM and to generate a first operating power P01 and a second operating power P02. The controller 124 is coupled to the power input port 121, the first power output port 123_1, the second power output port 123_2, and the power management circuit 122. The controller 124 is configured to control the operation of the power management circuit 122.

In an embodiment, a transmission interface standard that the power input port 121 is compatible with allows power transmission and data transmission at the same time. The controller 124 may perform data transmission with the power adapter 110 via the power input port 121 to receive supply power information of the power adapter 110. For example, the power input port 121 may be compatible with the USB Type-C standard. Accordingly, the controller 124 may obtain the supply power information of the power adapter 110 from the power adapter 110 via a configuration channel (CC) of the power input port 121. However, the disclosure is not limited thereto. The supply power information may include a plurality of sets of default supply powers. The default supply powers may respectively correspond to different voltage values, current values, and supplied powers. For example, Table 1 illustrates an example with six sets of the default supply powers of the power adapter 110. However, the disclosure is not limited thereto.

TABLE 1

| Voltage Value | Current Value | Supplied Power |
| --- | --- | --- |
| 5 V | 3 A | 15 W |
| 9 V | 3 A | 27 W |
| 10 V | 5 A | 50 W |
| 12 V | 5 A | 60 W |
| 15 V | 4.33 A | 65 W |
| 20 V | 3.25 A | 65 W |

In an embodiment, the first power output port 123_1 and the second power output port 123_2 may be compatible with the same transmission interface standard. For example, the transmission interface standard may be the USB Type-C standard. However, the disclosure is not limited thereto. Assuming that the first power output port 123_1 and the second power output port 123_2 are compatible with the USB Type-C standard, the controller 124 may obtain operating power information (i.e., first operating power information or second operating power information) corresponding to the first electronic device 130_1 or the second electronic device 130_2 via the configuration channel. However, the disclosure is not limited thereto.

In an embodiment, the controller 124 is further configured to detect connection states of the first power output port 123_1 and the second power output port 1232 with external devices. Assuming that the first power output port 123_1 and the second power output port 123_2 is compatible with the USB Type-C standard, the controller 124 may detect the connection states between the first power output port 123_1 and the second power output port 123_2 with the external devices via the configuration channel.

In an embodiment, when the first electronic device 130_1 and the second electronic device 130_2 are respectively connected to the first power output port 123_1 and the second power output port 123_2, the controller 124 may obtain the first operating power information of the first electronic device 130_1 and the second operating power information of the second electronic device 130_2 via the first power output port 123_1 and the second power output port 123_2. The first operating power information may include a voltage value and a current value required by the first electronic device 130_1. The second operating power information may include a voltage value and a current value required by the second electronic device 130_2.

In an embodiment, when only the first electronic device 130_1 is connected to the first power output port 123_1 while the second electronic device 130_2 is not connected to the second power output port 123_2, the controller 124 may determine the input electric power PM directly based on the first operating power information of the first electronic device 130_1. When the first electronic device 130_1 and the second electronic device 130_2 are respectively connected to the first power output port 123_1 and the second power output port 123_2, the controller 124 may determine the input electric power PM from the at least one default supply power of the power adapter 110 based on the first operating power information of the first electronic device 130_1 and the second operating power information of the second electronic device 1302, so as to control the power adapter 110 to provide the input electric power PM to the power input port 121.

In an embodiment, the controller 124 may calculate a total amount of power consumption (referred to as currently consumed power in the following) consumed by the first electronic device 130_1 and the second electronic device 130_2 according to the first and the second operating power information. Then, the controller 124 may choose the suitable input electric power PM from the at least one default supply power of the power adapter 110 based on the currently consumed power. Besides, to avoid power overload, the power of the input electric power PM determined by the controller 124 is higher than or equal to the currently consumed power. After determining the voltage value and the current value of the input electric power PM, the controller 124 may notify a controller (not shown) in the power adapter 110 via the power input port 121 to control the power adapter 110 to output the input electric power PM determined by the controller 124.

Taking Table 1 as an example, the controller 124 may be informed that the voltage and the current required by the first electronic device 130_1 are respectively 5V and 4A based on the first operating power information, and may be informed that the voltage and the current required by the second electronic device 130_2 are respectively 12V and 3A based on the second operating power information. Under the circumstance, the controller 124 may obtain the total power (i.e., the consumed power) required by the first electronic device 130_1 and the second electronic device 130_2 which is 56 W through calculation. Under the condition, after calculating the currently consumed power based on the first operating power information and the second operating power information, the controller 124 may choose a default supply power whose voltage value is 12V and current value is 5 A (60 W) as the input electric power PM to control the power adapter 110 to provide the input electric power PM whose voltage value is 12V and current value is 5 A.

In an embodiment, when the controller 124 determines that all the power of the at least one default supply power that the power adapter 110 is capable of providing is less than the currently consumed power (i.e., the total power consumed by the first electronic device 130_1 and the second electronic device 130_2) after the second electronic device 130_2 is connected to the second power output port 123_2, the controller 124 may disconnect the connection between the second electronic device 130_2 and the second power output port 123_2. Specifically, all the power of the at least one default supply power that the power adapter 110 is capable of providing being less than the currently consumed power indicates that the power consumed by the electronic devices connected to the hub device exceeds the power supply capability of the power adapter 110. To avoid power overload, the controller 124 may disconnect the connection between the second electronic device 130_2 and the second power output port 123_2, and the controller may stop supplying the power to the second electronic device 130_2.

In an embodiment, the power management circuit 122 is configured to receive the input electric power PM and to generate the first operating power P01 and the second operating power P02. Specifically, the controller 124 may obtain a voltage value and a current value of the first operating power P01 and a voltage value and a current value of the second operating power P02 based on the first operating power information and the second operating power information, and the controller 124 may control the power management circuit 122 to perform operations, such as voltage conversion and power transmission path switching operations, accordingly.

Therefore, under the control of the controller 124, the power management circuit 122 may output the first operating power P01 to the first power output port 123_1, and may output the second operating power P02 to the second power output port 1232. Consequently, the first electronic device 130_1 and the second electronic device 130_2 may respectively receive the suitable first operating power P01 and second operating power P02. It should be noted that the voltage value of the input electric power PM may be the same as or different from the voltage value of the first operating power P01. Similarly, the voltage value of the input electric power PM may be the same as or different from the voltage value of the second operating power P02. In other words, the power management circuit 122 is capable of converting voltages, and the voltage value of the first operating power P01 may be different from the voltage value of the second operating power P02.

Figure 3A:
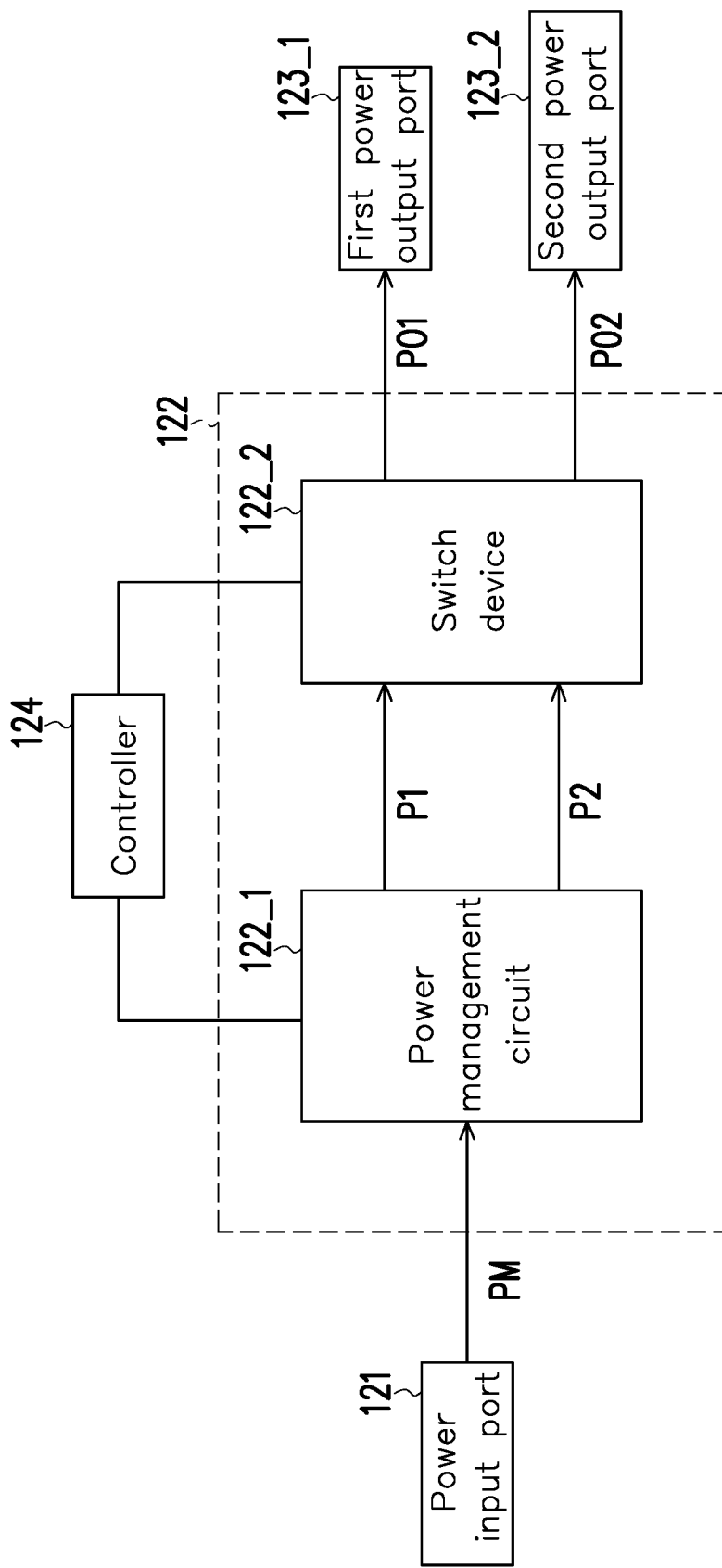
FIGS. 3A and 3B are block diagrams illustrating a power management circuit according to the embodiment of FIG. 2.
Figure 3B:
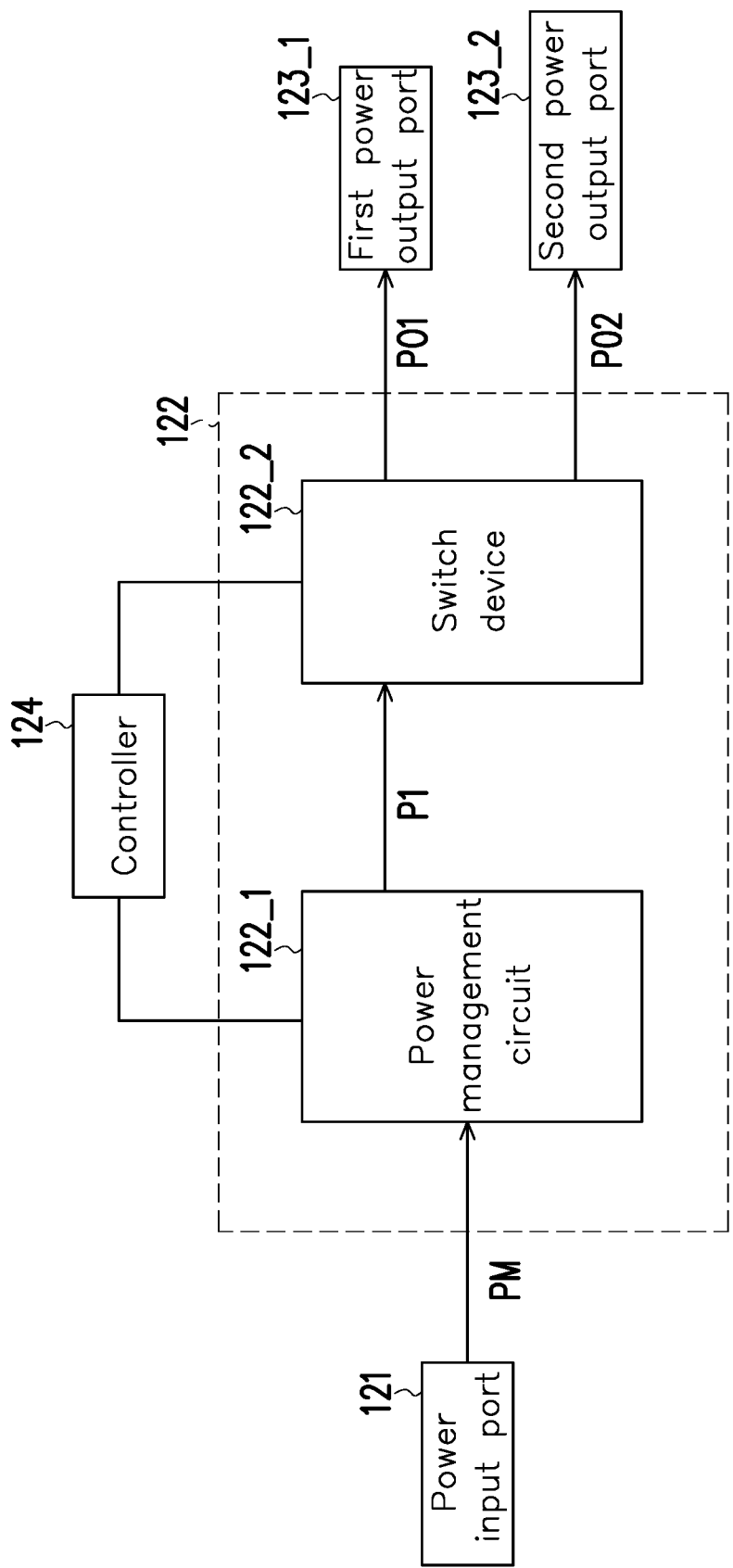

Some embodiments are described in the following for further details about the operation of the power management circuit 122. FIGS. 3A and 3B are block diagrams illustrating a power management circuit according to the embodiment of FIG. 2. Referring to FIGS. 3A and 3B, the power management circuit 122 may include a power converting circuit 122_1 and a switch device 122_2. The power converting circuit 122_1 is coupled to the controller 124 and the power input port 121. The switch device 122_2 is coupled to the controller 124, the power converting circuit 122_1, the first power output port 123_1, and the second output port 123_2.

The power converting circuit 122_1 may include a power converter configured to generate output electric powers with different voltage values. In other words, the controller 124 may control the power converting circuit 122_1 to convert the input electric power PM and generate at least one output electric power. Thus, a voltage value of the output electric power may be different from a voltage value of the input electric power PM. Besides, the power converting circuit 122_1 may also provide a bypass device, so that the input electric power PM may be directly output as the output electric power. In other words, the voltage value of the output electric power may also be the same as the voltage value of the input electric power PM. The switch device 122_2 may include a switch, a multiplexer, a logic circuit, or a device formed by a combination thereof. The disclosure is not limited thereto.

Referring to FIG. 3A, the power converting circuit 122_1 is configured to receive the input electric power PM and to generate an output electric power P1 and an output electric power P2. Thus, a voltage value of the output electric power P1 is different from a voltage value of the output electric power P2. More specifically, the controller 124 may determine the voltage values of the output electric power P1 and the output electric power P2 based on the first operating power information and the second operating power information, so as to control the power converting circuit 122_1 to generate the output electric power P1 and the output electric power P2. Furthermore, the power converting circuit 122_1 is also capable of converting the voltage of the input electric power PM. Nevertheless, the power converting circuit 122_1 may directly output the input electric power PM as the output electric power. Therefore, in an embodiment, the power converting circuit 122_1 may directly output the input electric power PM and may generate one of the output electric power P1 and the output electric power P2, and the power converting circuit 122_1 may boost or drop the voltage of the input electric power PM to generate the other of the output electric power P1 and the output electric power P2.

Referring to FIG. 3A, the switch device 122_2 receives the output electric power P1 and the output electric power P2. The controller 124 controls a switching state of the switch device 122_2 based on the first operating power information and the second operating power information. Accordingly, the switch device 122_2 may output the first operating power P01 to the first power output port 123_1 and output the second operating power P02 to the second power output port 123_2 based on the output electric power P1 and the output electric power P2.

Referring to FIG. 3B, the power converting circuit 122_1 is configured to receive the input electric power PM and to generate the output electric power P1. Comparing with FIG. 3A, when the operating voltages required by the first electronic device 130_1 and the second electronic device 130_2 are the same, the power converting circuit 122_1 generates the output electric power P1. The controller 124 may control the switching state of the switch device 122_2. Accordingly, the switch device 122_2 may output the first operating power P01 to the first power output port 123_1 and output the second operating power P02 to the second power output port 123_2 in response to receiving the output electric power P1. In the example of FIG. 3B, the voltage value of the first operating power P01 is the same as the voltage value of the second operating power P02. Besides, in one example, the power converting circuit 122_1 may directly output the input electric power PM to generate the output electric power P1. Alternatively, the power converting circuit 122_1 may boost or drop the voltage of the input electric power PM and generate the output electric power P1.

In an embodiment, the hub device may further include a detecting circuit coupled between each of the power output ports and the power management circuit. The detecting circuit may detect whether the operating powers output to the power output ports are normal or not. Besides, the embodiment shown in FIG. 2 is described with an example having two power output ports. However, the disclosure is not limited thereto. In another embodiment, a hub device may include four power output ports, the detail is described in the following.

Figure 4:
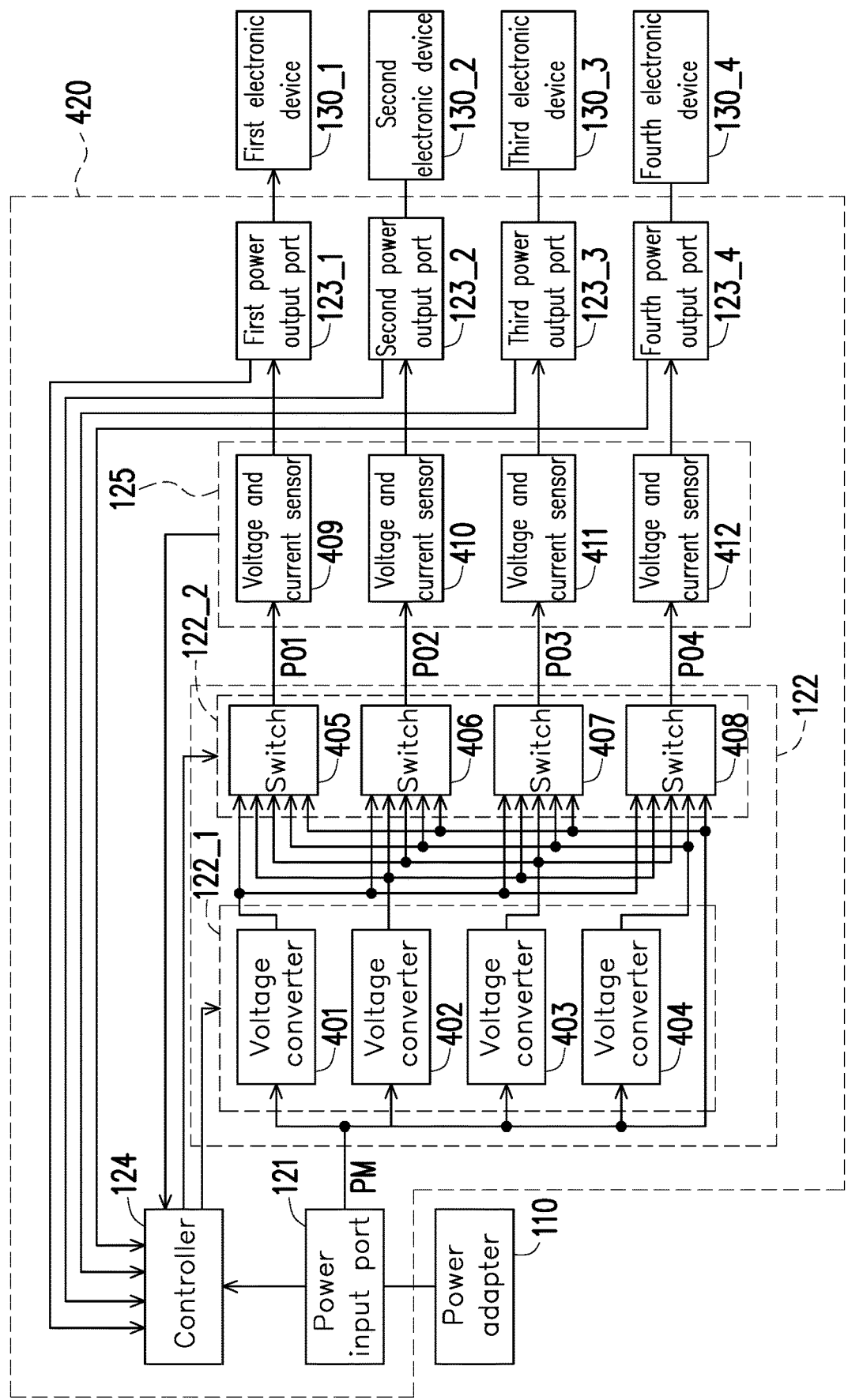
FIG. 4 is a block diagram illustrating a hub device according to an embodiment of the disclosure.

FIG. 4 is a block diagram illustrating a hub device according to an embodiment of the disclosure. Referring to FIG. 4, a hub device 420 may include the power input port 121, the power management circuit 122, the first power output port 123_1, the second power output port 123_2, a third power output port 123_3, a fourth power output port 123_4, the controller 124, and a detecting circuit 125.

In the example of FIG. 4, the controller 124 is configured to detect connection states of the first power output port 123_1, the second power output port 123_2, the third power output port 123_3, and the fourth power output port 123_4. When the first power output port 123_1, the second power output port 1232, the third power output port 123_3, and the fourth power output port 123_4 are respectively connected to the first electronic device 130_1, the second electronic device 130_2, the third electronic device 130_3, and a fourth electronic device 130_4, the controller 124 may determine the input electric power PM from the at least one default supply power of the power adapter 110. The controller 124 may determine the input electric power PM based on the first operating power information of the first electronic device 130_1, the second operating power information of the second electronic device 130_2, third operating power information of the third electronic device 130_3, and fourth operating power information of the fourth electronic device 130_4.

Besides, referring to FIG. 2, after the controller 124 determines the voltage value of the input electric power PM, the controller 124 may control the power management circuit 122 to generate the first operating power P01, the second operating power P02, the third operating power P03, and the fourth operating power P04, and the controller 124 may respectively output the first operating power P01, the second operating power P02, the third operating power P03, and the fourth operating power P04 to the first power output port 123_1, the second power output port 123_2, the third power output port 123_3, and the fourth power output port 123_4.

Referring to FIG. 4, the power converting circuit 122_1 of the power management circuit 122 includes voltage converters 401 to 404, and the switch device 122_2 of the power management circuit 122 includes switches 405 to 408. Nevertheless, the numbers of the voltage converters and the switches may be determined based on the number of the power output ports of the hub device, and the disclosure is not limited thereto. The controller 124 may control the voltage converters 401 to 404 to convert the voltage based on the voltage value of the input electric power PM and voltage values required by the respective electronic devices. The respective switches 405 to 408 may receive output electric powers generated by the voltage converters 401 to 404, and may receive the input electric power PM via a bypass device. Moreover, the controller 124 controls switching states of the switches 405 to 408. Accordingly, the respective electronic devices may receive the first operating power P01, the second operating power P02, the third operating power P03, and the fourth operating power P04 meeting the needs of the respective electronic devices.

The detecting circuit 125 is coupled between the switch device 122_2 and the first power output port 123_1, the second power output port 123_2, the third power output port 123_3, and the fourth power output port 123_4. In addition, the controller 124 may use the detecting circuit 125 to determine whether the first operating power P01, the second operating power P02, the third operating power P03, and the fourth operating power P04 output by the switch device 122_2 are normal or not.

More specifically, the detecting circuit 125 may include voltage and current sensors 409 to 412. The respective voltage and current sensors 409 to 412 are respectively connected in series between the respective switches 405 to 408 and the first power output port 123_1, the second power output port 123_2, the third power output port 123_3, and the fourth power output port 123_4. The voltage and current sensors 409 to 412 may respectively detect the voltage values and the current values of the first operating power P01, the second operating power P02, the third operating power P03, and the fourth operating power P04. In addition, the controller 124 may determine whether the first operating power P01, the second operating power P02, the third operating power P03, and the fourth operating power P04 output by the switch device 122_2 are compatible with the operating power information provided by the respective electronic devices based on sensing data provided by the voltage and current sensors 409 to 412. For example, each of the voltage and current sensors 409 to 412 may be a precision resistor. Based on a voltage difference between two ends of the precision resistor and a predetermined resistance value of the precision resistor, the controller 124 may determine whether the current value of a current output by one of the switches 405 to 408 exceeds the current value set in the operating power information of the electronic device. When the first operating power P01, the second operating power P02, the third operating power P03, or the fourth operating power P04 output by the switch device 122_2 is abnormal, the controller 124 may control the switch device 122_2 to stop outputting the abnormal one of the first operating power P01, the second operating power P02, the third operating power P03, and the fourth operating power P04. Meanwhile, other normal operating powers may still be output normally.

Figure 5:
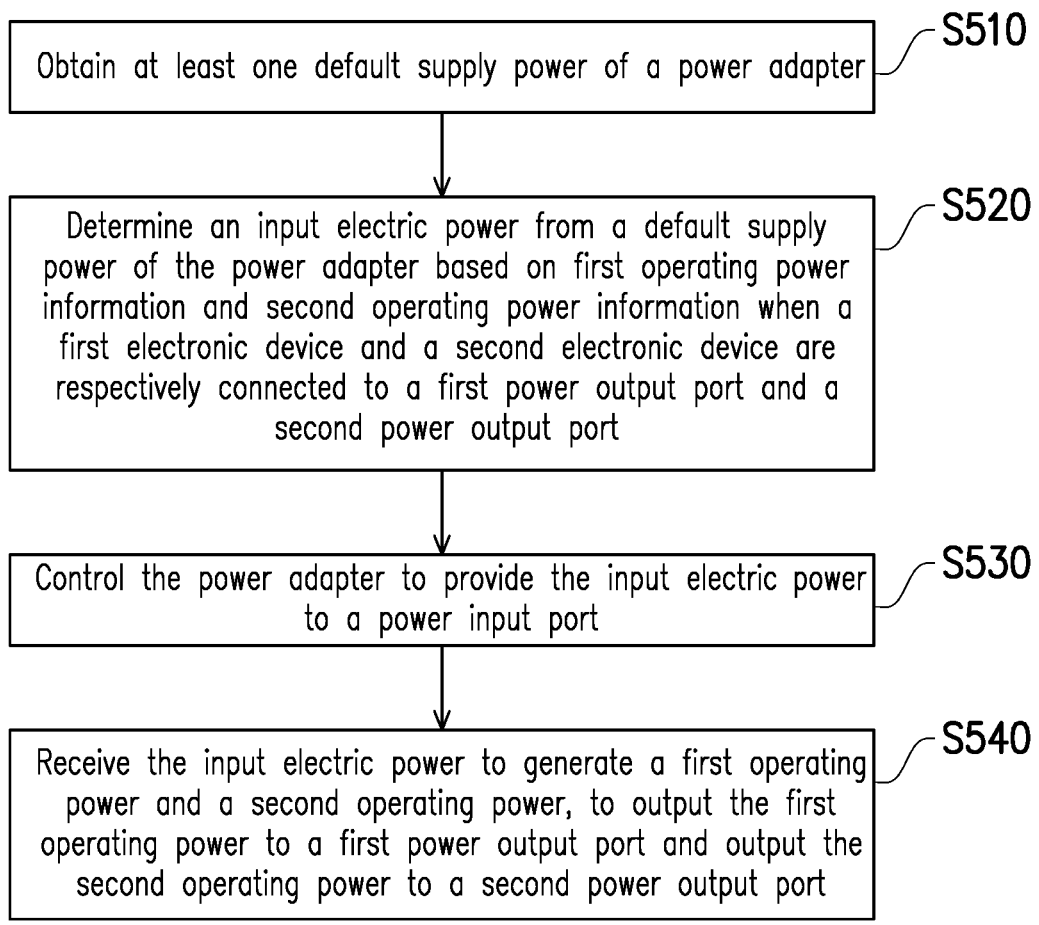
FIG. 5 is a flowchart illustrating a power supply method according to an embodiment of the disclosure.

FIG. 5 is a flowchart illustrating a power supply method according to an embodiment of the disclosure. The power supply method is suitable for the hub device 120 shown in FIG. 2 or the hub device 420 shown in FIG. 4, for example. Details of the respective steps may be referred to the foregoing embodiments and examples.

In Step S510, at least one default supply power of a power adapter is obtained. The power adapter is connected to a power input port. In Step S520, when a first electronic device and a second electronic device are respectively connected to a first power output port and a second power output port, an input electric power is determined from the at least one default supply power of the power adapter based on first operating power information of the first electronic device and second operating power information of the second electronic device. In Step S530, the power adapter is controlled to provide an input electric power to the power input port. In Step S540, the input electric power is received by a power management circuit to generate the first operating power and the second operating power. The first operating power is output to the first power output port, and the second operating power is output to the second power output port.

Figure 6A:
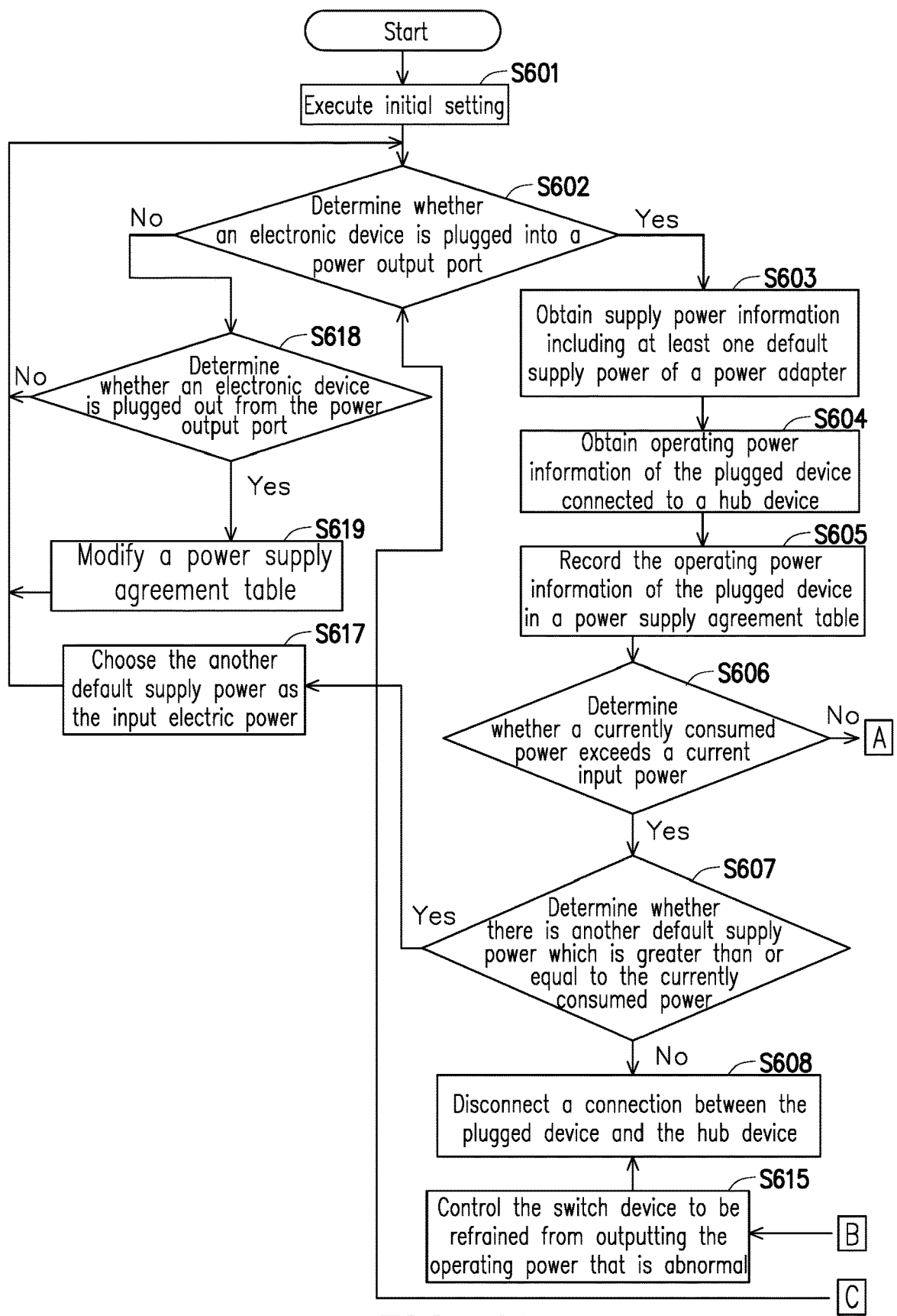
FIGS. 6A and 6B are flowcharts illustrating a power supply method according to an embodiment of the disclosure.
Figure 6B:
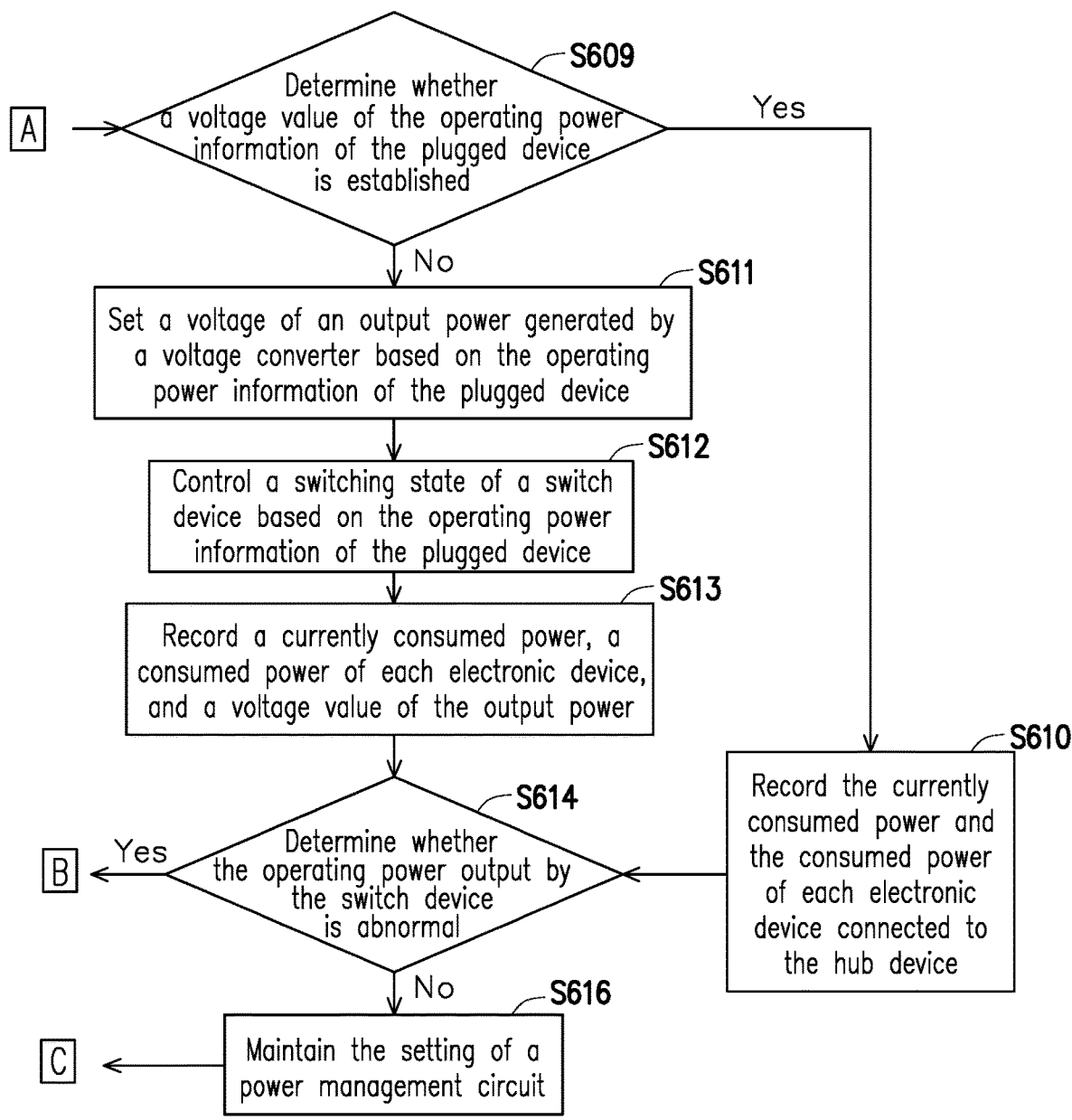

In the following, details on the steps of the controller of the hub device are further described in the following. FIGS. 6A and 6B are flowcharts illustrating a power supply method according to an embodiment of the disclosure. The embodiment is described in the following with reference to the embodiment of FIG. 4. The foregoing embodiments may be taken into consideration for the details of the respective steps in FIGS. 6A and 6B.

Referring to FIGS. 4, 6A, and 6B, in Step S601, the controller 124 executes initial setting. In Step S602, the controller 124 determines whether any electronic device is plugged into the first power output port 123_1, the second power output port 123_2, the third power output port 123_3, and the fourth power output port 1234. It should be noted that, "plugged device" in the following description represents an electronic device which is plugged into one of the first power output port 123_1, the second power output port 123_2, the third power output port 123_3, and the fourth power output port 123_4, and the plugged device may be any one of the first electronic device 130_1, the second electronic device 130_2, the third electronic device 130_3, and the fourth electronic device 130_4 shown in FIG. 4. If, in Step S602, it is determined that the plugged device is plugged into one of the first power output port 123_1, the second power output port 1232, the third power output port 123_3, and the fourth power output port 123_4, in Step S603, the controller 124 may obtain the supply power information including the at least one default supply power of the power adapter 110. In Step S604, the controller 124 may obtain the operating power information of the plugged device connected to the hub device 420. In Step S605, the controller 124 records the operating power information of the plugged device in a power supply table. The operating power information of other electronic devices connected to the hub device prior to the plugged device, which is connected to the hub device, is also recorded in the power supply table.

In Step S606, based on the information in the power supply table, the controller 124 may calculate the currently consumed power, and may determine whether the currently consumed power exceeds the power of the current input electric power PM. When it is determined that the currently consumed power exceeds the power of the current input electric power PM in Step S606, the controller 124 may determine whether there is another default supply power whose power is greater than the currently consumed power in Step S607. When it is determined that there is no default supply power whose power is greater than the currently consumed power in Step S607, the controller 124 may disconnect the connection between the plugged device and the hub device 420 in Step S608. When it is determined that there is another default supply power whose power is greater than the currently consumed power in Step S607, the controller 124 may alternatively choose the another default supply power as the input electric power in Step S617, and the power of the another default supply power is greater than or equal to the currently consumed power. As such, the controller 124 may control the power adapter 110 to provide the changed input electric power PM.

In another embodiment, when it is determined that the currently consumed power does not exceed the power of the current input electric power PM in Step S606, the controller 124 may determine whether the voltage value in the operating power information of the plugged device is established in Step S609. Here, the controller 124 determines whether any of the voltage converters 401 to 404 provides the voltage value in the operating power information of the plugged device. When it is determined that the voltage value in the operating power information of the plugged device is established in Step S609, the controller 124 may record the currently consumed power and the power capacities consumed by the respective electronic devices connected to the hub device 420 in Step S610. When it is determined that the voltage value in the operating power information of the plugged device is not established in Step S609, the controller 124 may set the voltage values of the output electric powers generated by the voltage converters 401 to 404 based on the operating power information of the plugged device, so as to control the power converting circuit 122_1 to generate the corresponding output electric powers in Step S611. In Step S612, the controller 124 may control the switching state of the switch device 122_2 based on the operating power information of the plugged device. In Step S613, the controller 124 may record the currently consumed power, the power capacities consumed by the respective electronic devices connected to the hub device 420, and the voltage values of the output electric powers. Accordingly, after Step S610 and Step S613, the hub device 420 may provide suitable operating powers to the respective electronic devices connected to the hub device 420.

For example, in a scenario where the first electronic device 130_1, the second electronic device 130_2, the third electronic device 130_3, and the fourth electronic device 130_4 are all connected to the hub device 420. An example of the power supply table is shown in Table 2, and the power supply table is generated after the controller 124 performs the corresponding determinations and the operations.

TABLE 2

|  | Input Electric Power of Power Adapter | First Power Output Port | Second Power Output Port | Third Power Output Port | Fourth Power Output Port |
|---|---|---|---|---|---|
| Voltage Value | 20 V | 5 V | 5 V | 20 V | 12 V |
| Current Value | 3.25 A | 1 A | 2 A | 1.5 A | 1 A |
| Output Voltage of Voltage Converter |  | 5 V |  |  | 12 V |
| Bypass Device of Power Converting Circuit |  | off | off | on | off |
| Operating Voltage Output by Switch |  | 5 V | 5 V | 20 V | 12 V |
| Consumed Power |  | 5 W | 10 W | 30 W | 12 W |
| Currently Consumed Power |  |  | 57 W |  |  |
| Power | 65 W |  |  |  |  |

Based on Table 2 and using the configuration of FIG. 4, for example, after the first electronic device 130_1, the second electronic device 130_2, the third electronic device 130_3, and the fourth electronic device 130_4 are sequentially connected to the hub device 420, the controller 124 may obtain that the currently consumed power which is 57 W through calculation and may choose the default supply power whose power is 65 W from the default supply powers as the input electric power PM. Hence, since the voltage value of the input electric power PM is 20V, and the operating voltage required by the third electronic device 130_3 is 20V, the controller 124 may control the bypass device to be turned on, so that the switch 407 may receive the input electric power at 20V. Accordingly, the switch 407 may output the third operating power P03 at 20V, and the voltage value of the third operating power P03 output by the switch 407 thus meets the needs of the third electronic device 130_3. Moreover, since the voltage value of the input electric power PM is 20V, and the operating voltages required by the first electronic device 130_1 and the second electronic device 130_2 are both 5V, the controller 124 may control the voltage converter 401 to convert the voltage and generate the output voltage at 5V. Besides, the controller 124 may control the switches 405 and 406 to output the output electric power at 5V as the first operating power P01 and the second operating power P02. Furthermore, since the voltage value of the input electric power PM is 20V, and the operating voltage required by the fourth electronic device 130_4 is 12V, the controller 124 may control the voltage converter 402 to convert the voltage and generate the output voltage at 12V. Moreover, the controller 124 may control the switch 408 to output the output electric power at 12V as the fourth operating power P04.

Back to FIGS. 6A and 6B, in Step S614, the controller 124 may determine whether the operating power output by the switch device 122_2 is normal by the detecting circuit 125. When it is determined that the operating power output by the switch device 122_2 is normal in Step S614, the controller 124 may maintain the setting of the power management circuit 122 in Step S616. Accordingly, the hub device 420 may continue to supply the power to the electronic devices which is connected to the first power output port 123_1, the second power output port 1232, the third power output port 123_3, and the fourth power output port 123_4. When it is determined that the operating power output by the switch device 122_2 is abnormal in Step S614, the controller 124 may control the switch device 122_2 to stop outputting the abnormal operating power.

In another embodiment, when it is determined that no plugged device is plugged into one of the first power output port 123_1, the second power output port 123_2, the third power output port 123_3, and the fourth power output port 123_4 in Step S602, the controller 124 may determine whether an electronic device is plugged out from the power output port in Step S618. When it is determined that an electronic device is plugged out from the power output port in Step S618, the controller 124 may modify the power supply table and remove information relating to the electronic device, which is plugged out from the power output port, from the power supply table. That is, after removing the information relating to the electronic device that is plugged out from the power supply table, the operating power information, relating to the electronic device that is plugged out, may not be adopted by the controller 24.

In view of the foregoing, in the embodiments of the disclosure, the hub device may control the power adapter to provide the corresponding input electric power based on the electronic device actually connected to the hub device. Besides, based on the operating power information of the electronic devices connected to the hub device, the hub device may correspondingly generate multiple sets of operating powers based on the input electric power. Accordingly, suitable operating powers may be supplied to multiple electronic devices. Considering the trend of unifying the transmission interface (e.g., the wide variety of the applications of USB Type-C interface), using the hub device may significantly reduce the number of power adapters required and may make the hub device broadly applicable across various electronic devices. Hence, the use of electronic devices may become less confusing and more convenient. Besides, since the hub device is capable of determining the input electric power based on the operating power information of the electronic devices connected to the hub device, the hub device may have a more desirable conversion efficiency and may be able to reduce loss of power. Furthermore, by determining whether the currently consumed power exceeds the default power that the power adapter is capable of providing, the hub device according to the embodiments of the disclosure may stop providing power to one of the electronic devices to lower the risk of power overload and to ensure that power is supplied to the rest of the electronic devices normally.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A hub device, comprising:
a power input port, connected to a power adapter;
a first power output port and a second power output port;
a power management circuit, coupled to the power input port, the first power output port, and the second power output port; and
a controller, coupled to the power input port, the first power output port, the second power output port, and the power management circuit,
wherein when a first electronic device and a second electronic device are respectively connected to the first power output port and the second power output port, the controller determines an input electric power from at least one default supply power of the power adapter based on first operating power information of the first electronic device and second operating power information of the second electronic device, and the controller controls the power adapter to provide the input electric power to the power input port,
wherein the power management circuit receives the input electric power to generate a first operating power and a second operating power, and the power management circuit outputs the first operating power to the first power output port and outputs the second operating power to the second power output port,
wherein the power management circuit comprises:
a power converting circuit, coupled to the controller and the power input port, wherein the power converting circuit is configured to receive the input electric power and to generate at least one output electric power; and
a switch device, coupled to the controller, the power converting circuit, the first power output port, and the second power output port, wherein the switch device is configured to receive the at least one output electric power,
wherein the controller determines a voltage value of the at least one output electric power based on the first operating power information and the second operating power information to control the power converting circuit to generate the at least one output electric power, and wherein the controller controls a switching state of the switch device based on the first operating power information and the second operating power information, such that the switch device outputs the first operating power to the first power output port and outputs the second operating power to the second power output port based on the at least one output electric power.

2. The hub device as claimed in claim 1, wherein a voltage value of the first operating power is different from a voltage value of the second operating power.

3. The hub device as claimed in claim 1, wherein the controller controls the power converting circuit to convert the input electric power and generate the at least one output electric power, wherein a voltage value of one of the at least one output electric power is different from a voltage value of the input electric power.

4. The hub device as claimed in claim 1, further comprising a detecting circuit coupled between the switch device, and the first power output port and the second power output port, wherein the controller is configured to detect whether the first operating power and the second operating power output by the switch device are normal by the detecting circuit,
wherein when the first operating power or the second operating power output by the switch device is abnormal, the controller controls the switch device stop outputting the first operating power or the second operating power.

5. The hub device as claimed in claim 1, wherein the controller obtains the at least one default supply power of the power adapter via the power input port.

6. A power supply method, suitable for a hub device comprising a power input port, a first power output port, and a second power output port, comprising:
obtaining at least one default supply power of a power adapter, wherein the power adapter is connected to the power input port;
determining an input electric power from the at least one default supply power of the power adapter based on first operating power information of a first electronic device and second operating power information of a second electronic device when the first electronic device and the second electronic device are respectively connected to the first power output port and the second power output port;
controlling the power adapter to provide the input electric power to the power input port; and
receiving the input electric power to generate a first operating power and a second operating power to output the first operating power to the first power output port and output the second operating power to the second power output port,
wherein the step of generating the first operating power and the second operating power based on the input electric power to output the first operating power to the first power output port and output the second operating power to the second power output port further comprises:
determining a voltage value of the at least one output electric power based on the first operating power information and the second operating power information to control a power converting circuit to generate the at least one output electric power; and
controlling a switching state of a switch device based on the first operating power information and the second operating power information, such that the switch device outputs the first operating power to the first power output port and outputs the second operating power to the second power output port based on the at least one output electric power.

7. The power supply method as claimed in claim 6, further comprising:
   obtaining the first operating power information of the first electronic device and the second operating power information of the second electronic device when the first electronic device and the second electronic device are respectively connected to the first power output port and the second power output port.

8. The power supply method as claimed in claim 6, wherein a voltage value of the first operating power is different from a voltage value of the second operating power.

9. The power supply method as claimed in claim 6, wherein the step of determining the voltage value of the at least one output electric power based on the first operating power information and the second operating power information to generate the at least one output electric power comprises:
   controlling the power converting circuit to convert the input electric power and thereby generate the at least one output electric power, wherein a voltage value of one of the at least one output electric power is different from a voltage value of the input electric power.

10. The power supply method as claimed in claim 6, wherein the step of outputting the first operating power and the second operating power based on the input electric power, the first operating power information, and the second operating power information further comprises:
    determining whether the first operating power and the second operating power output by the switch device are normal by a detecting circuit; and
    controlling the switch device to stop outputting the first operating power or the second operating power by a controller when the first operating power or the second operating power output by the switch device is abnormal.

11. The power supply method as claimed in claim 6, wherein the step of determining the input electric power from the at least one default supply power of the power adapter based on the first operating power information and the second operating power information further comprises:
    calculating a currently consumed power based on the first operating power information and the second operating power information, and determining the input electric power from the at least one default supply power based on the currently consumed power, wherein a power of the input electric power is higher than or equal to the currently consumed power.

12. The power supply method as claimed in claim 11, further comprising:
    disconnecting a connection between the second electronic device and the second power output port when the power of the at least one default supply power is all lower than the currently consumed power.

13. The hub device as claimed in claim 1, wherein the controller obtains the first operating power information of the first electronic device and the second operating power information of the second electronic device via the first power output port and the second power output port.

14. The hub device as claimed in claim 1, wherein the controller calculates a currently consumed power based on the first operating power information and the second operating power information, and determines the input electric power from the at least one default supply power based on the currently consumed power, wherein a power of the input electric power is higher than or equal to the currently consumed power.

15. The hub device as claimed in claim 14, wherein when the power of the at least one default supply power is all lower than the currently consumed power, the controller disconnects a connection between the second electronic device and the second power output port.

* * * * *